United States Patent Office 2,895,964
Patented July 21, 1959

2,895,964

PURIFICATION OF COUMESTROL

Oliver H. Emerson, Orinda, and Emanuel M. Bickoff, Berkeley, Calif., assignors to the United States of America as represented by the Secretary of Agriculture No Drawing. Application April 4, 1958
Serial No. 726,588

5 Claims. (Cl. 260—343.2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its prime object the provision of novel methods for preparing coumestrol. A particular object of the invention concerns the provision of novel methods for preparing pure crystalline coumestrol from impure preparations containing coumestrol. Further objects and advantages of the invention will be evident from the description herein.

In the co-pending patent application of E. M. Bickoff and A. N. Booth, Serial No. 693,785, filed Oct. 31, 1957, there is disclosed a previously unknown compound and methods for isolating it from forage crops such as ladino clover, alfalfa, etc. The inventors also disclose that the compound exhibits estrogenic activity and may be employed in animal raising to obtain increased weight gain and increased efficiency of feed utilization. The compound in question has been named coumestrol by the inventors and structurally it is 7',6-dihydroxycoumarino-(3',4'-3,2)-coumarone having the formula—

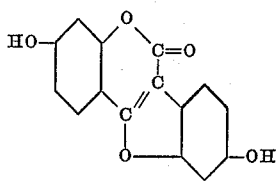

The compound will be referred to herein as coumestrol for the sake of brevity without loss of accuracy.

In accordance with the present invention it has been found that coumestrol may be prepared by hydrolysis of coumestrol esters.

The invention may be applied to any of the esters of coumestrol, such compounds being represented by the formula—

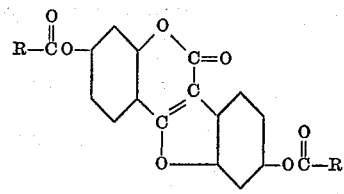

wherein each of the

radicals represents an acyl radical. The acyl radicals may be the same or different from one another and may be derived from any carboxylic acid; for example, acetic acid, propionic acid, butyric acid, isobutyric acid, valeric acid, isovaleric acid, caproic acid, caprylic acid, capric acid, lauric acid, myristic acid, palmitic acid, stearic acid, oleic acid, palmitoleic acid, benzoic acid, dinitrobenzoic acid, orthotoluic acid, metatoluic acid, paratoluic acid, etc.

The hydrolysis of the coumestrol ester essentially involves contacting it with an alkali metal hydroxide such as potassium hydroxide, sodium hydroxide, an alkali metal alcoholate, or the like. Since the coumestrol esters are relatively insoluble in water, the reaction is preferably conducted in solution in an inert organic solvent such as methanol, ethanol, propanol, isopropyl alcohol, any of the isomeric butyl alcohols, the mono-methyl or mono-ethyl ethers of ethylene glycol, etc. An excess of alkali over the theoretical amount necessary to saponify the two acyloxy radicals is generally employed. Usually there is used sufficient alkali to furnish about six or more moles of OH⁻ per mole of ester. The temperature of reaction is not critical and may be varied from about 0 to 100° C. Usually, a temperature of about 50–75° C. is preferred as giving a rapid rate of reaction without danger of decomposition. The reaction is complete when the two acyloxy groups have been converted to hydroxy groups.

After the alkaline hydrolysis is complete, the reaction mixture is acidified by adding an acid such as hydrochloric, sulphuric, phosphoric, or the like. This converts the salt (or phenolate) form of the product into the free phenol form of coumestrol. It is also believed that in the alkaline hydrolysis the lactone ring of the coumarin moiety is opened. However, acidification of the hydrolysis product restores the original lactone formation.

Coumestrol is readily isolated from the acidified reaction mixture on addition of water since it is relatively insoluble in water. The coumestrol so obtained may be re-crystallized from methanol, methanol-chloroform, or acetone. Prior to recrystallization, it is usually desirable to treat the product to remove colored impurities. This may conveniently be done by contacting the coumestrol in solution in acetone, methanol, or the like with charcoal. The charcoal absorbs the impurities so that coumestrol recrystallized from the solution is especially light in color and pure.

It is often preferred to add an antioxidant to the reaction mixture in the alkaline hydrolysis described above for the purpose of preventing oxidation of coumestrol during the reaction. For this purpose one may employ any of the antioxidants generally useful for preventing oxidation of fats, oils, rubber, etc. Typical antioxidants which may be employed are nordihydroguaiaretic acid; thiodipropionic acid; lauryl thiodipropionate; ethyl gallate; propyl gallate; catechol; pyrogallol; hydroquinone monomethyl ether; p-tertiarybutyl catechol; diphenylamine; ethyl hydrocaffeate; 2,4-ditertiarybutyl-3,6-bis(dimethylaminomethyl)-hydroquinone; t-butylated hydroxyanisole; 4-acetyl pyrogallol; 4-acetyl-6-ethyl-pyrogallol; chlorogenic acid; N,N'-di-sec.-butyl-p-phenylene diamine; 2-tertiarybutyl-4-methoxy phenol; p-isopropoxy diphenylamine; 2,5-ditertiarybutyl hydroquinone; 2,5-dibenzyl hydroquinone; diphenyl p-phenylene diamine; p-hydroxy diphenylamine; N-sec.-butyl p-aminophenol; 6-ethoxy-2,2,4-trimethyl-1,2-dihydroquinoline; 6-phenyl-2, 2,4-trimethyl-1,2-dihydroquinoline; 2,2,4-trimethyl-1,2-dihydroquinoline; 7-chloro-2,2,4-trimethyl-1,2-dihydroquinoline; ascorbyl palmitate; isoascorbyl palmitate; 2,2'-methylene bis(4-methyl-6-tertiarybutyl phenol); dibenzyl catechol; octyl cresol; 2,7-dihydroxynaphthalene; 2,5-dihydroxy diphenyl; and the like.

In general, only a minor amount of antioxidant is used, i.e., about 0.01 to 1%, based on the weight of coumestrol ester. A greater proportion of antioxidant of course, can be employed but generally without any particular advantage. Usually it is preferred to employ antioxidants which are nitrogenous bases and which form water-soluble salts with acids. In such case the antioxidant remains in solution when the alkaline hydrolysis mixture is acidified, whereas the coumestrol product precipitates out of solution. For this reason it is preferred to use 2,2,4-trimethyl-1,2-dihydroquinoline or its various derivatives thereof such as the 6-ethoxy, 6-phenyl, or 7-chloro derivatives. However, even if one uses an antioxidant which precipitates with the coumestrol, no harm is done because the accompanying antioxidant will serve to stabilize the coumestrol on storage. In addition to, or in place of, the antioxidant one may minimize oxidation during the alkaline hydrolysis by conducting the reaction in an atmosphere of an inert gas such as nitrogen.

An especially important aspect of the invention is that it may be utilized for the production of pure crystalline coumestrol from mixtures containing the same. One problem in the production of coumestrol, either by isolation from natural sources or by organic synthesis is that it is difficult to obtain this compound in pure form. This is particularly the case because coumestrol does not crystallize readily especially when contaminated with significant amounts of impurities. As a consequence it is difficult to isolate coumestrol from associated impurities. This problem is demonstrated by reference to the co-pending application of O. H. Emerson and E. M. Bickoff, Ser. No. 710,586, filed Jan. 22, 1958, wherein is described and claimed methods for synthesizing coumestrol. The method, briefly described, involves reacting an omega (2,4-dialkoxyphenyl) resacetophenone with an alkyl haloformate and hydrolyzing the ester product to produce a 3(2,4-dialkoxyphenyl)-4,7-dihydroxy coumarin. This compound is then heated with an aromatic amine hydrohalide to produce coumestrol. The inventors point out that to avoid the difficulty of isolating coumestrol, it is converted to an ester and recovered in the ester form.

It has now been found that coumestrol can be obtained in pure crystalline form from impure preparations thereof by a process which essentially involves subjecting the crude preparation to reaction with an acylating agent, separating the coumestrol ester from the acylation product and hydrolyzing the coumestrol ester to obtain pure coumestrol.

In applying this purification process the crude coumestrol preparation may be one produced by any means, for example, by the heating of a 3(2,4-dialkoxyphenyl)-4,7-dihydroxy coumarin with an aromatic amine hydrohalide in accordance with the Emerson and Bickoff application or by extraction from forage materials by the procedures of the aforesaid Bickoff and Booth application.

In the first step of the process of this invention the crude coumestrol preparation is reacted with an acylating agent. The acylating agent may be, for example, the anhydride, chloride, bromide, or iodide of any aliphatic and aromatic hydrocarbon carboxylic acid such as acetic, propionic, butyric, isobutyric, valeric, isovaleric, caproic, caprylic, capric, lauric, myristic, palmitic, stearic, arachidic, oleic, palmitoleic, benzoic, dinitro-benzoic, o-toluic, m-toluic, p-toluic, etc. Generally it is preferred to employ a low molecular weight acylating agent such as acetic anhydride or propionic anhydride. It is obvious that by selection of the acylating agent, any desired coumestrol ester can be prepared. The acylating agent is employed in a proportion to furnish at least 2 moles of the acyl radical per mole of coumestrol thus to ensure esterifying both hydroxyl groups. To enhance contact between the reactants an inert solvent may be added, or, in the alternative, such an excess of acylating agent may be used to function both as reactant and solvent. Suitable inert solvents are, for example, benzene, toluene, xylene, dioxane, acetone, ether, methyl-ethyl ketone, diethyl ketone, di-isopropyl ether, the diethyl ether of ethylene glycol, etc. The temperature of reaction is not critical and may be varied from about 0 to 175° C. Usually temperatures of around 75 to 150° C. are used to expedite the esterification. The reaction is of course complete when the desired coumestrol di-ester is formed. To expedite the esterification, it is generally preferred to add to the reaction system a conventional esterification promoter such as for example the alkali salt of the acid in question (e.g., sodium acetate when coumestrol diacetate is being prepared), pyridine, quinoline, N-dimethyl aniline, potassium carbonate, or the like. The coumestrol esters are readily isolatable from the reaction mixture on addition of water since they are relatively insoluble in this solvent. Moreover the coumestrol esters can be readily isolated in pure form since they crystallize easily. Thus they may be crystallized from such solvents as acetonitrile, acetone, acetone-alcohol, etc. Moreover, the lower aliphatic esters of coumestrol can be isolated by sublimation. For example coumestrol diacetate sublimes at about 150° C. at a pressure of $10^{-4}$ mm. of mercury.

After separation of the coumestrol ester from the esterification reaction mixture, the ester is hydrolyzed as previously described to produce pure crystalline coumestrol. This pure coumestrol is a highly desirable product as being free from impurities it will exert desired physiological results without interference or complications as might be experienced with an impure product.

As disclosed in the aforementioned patent application of Bickoff and Booth, coumestrol exhibits estrogenic properties and is useful in animal raising to increase growth rate and to increase efficiency of feed utilization. As a typical example, coumestrol may be incorporated in minor amounts, for example 0.001 to 1 lb. per ton, in conventional feed containing a major proportion of vegetable material such as corn, wheat, barley, milo, alfalfa, cottonseed meal, soybean meal, etc. Such supplemented feed when supplied to animals particularly those grown for meat purposes, e.g., steers, will cause the animals to gain weight more rapidly and to produce more flesh per pound of feed.

The invention is further demonstrated by the following examples wherein Example I illustrates the synthesis of impure coumestrol according to the process of the aforesaid Emerson and Bickoff application and Examples II and III illustrate the preparation of pure coumestrol in accordance with the present invention.

*Example I*

Omega (2,4-dimethoxyphenyl) resacetophenone (3.1 g.), acetone (50 ml.), methyl chloroformate (2 ml.), and potassium carbonate (8 g.) were refluxed for four hours. The reaction mixture was cooled, diluted with 100 ml. of water and acidified with hydrochloric acid. The precipitate was filtered, washed with water and dried. The dry precipitate was dissolved in about 20 ml. of methanol and to this solution was added sufficient of a 20% solution of potassium hydroxide in methanol to turn alizarin-yellow orange (pH about 11). The solution was refluxed for 10 minutes under an inert atmosphere, then cooled, diluted with water, and acidified with hydrochloric acid. The precipitate was filtered off and recrystallized from alcohol. The product, 3(2,4-dimethoxyphenyl)-4,7-dihydroxy coumarin, obtained in a yield of 75%, had a melting point of 250-255° C. *Analysis.*—Calculated for $C_{17}H_{14}O_6$—C, 64.95%; H, 4.49%. Found: C, 65.0%; H, 4.5%.

One gram of 3(2,4-dimethoxyphenyl)-4,7-dihydroxy coumarin was mixed with 2 grams of aniline hydrochloride. The mixture was heated under an atmosphere of carbon dioxide for 3.5 hours at 210-220° C. The reaction mixture was cooled, then successively extracted with water (about 10 cc.) then with alcohol (about 5 cc.) to remove pigmented impurities. The residue was an impure preparation of coumestrol obtained in a yield of 60%.

Example II

The crude coumestrol (530 mg.) obtained as described in Example I, was suspended in a mixture of 5 cc. acetic anhydride and 0.5 g. fused sodium acetate. The mixture was boiled for 5 minutes then poured into water. The coumestrol diacetate was filtered off and recrystallized from acetonitrile. The recrystallized product had a melting point of 234–235° C. *Analysis.*—Calculated for $C_{19}H_{12}O_7$—C, 64.75; H, 3.44%. Found: C, 64.7; H, 3.51%. The yield was 55%, based on the amount of 3(2,4-dimethoxyphenyl) - 4,7 - dihydroxy coumarin. The product may also be termed 7',6-diacetyloxy coumarino-(3',4'-3,2)-coumarone.

One hundred mg. of the coumestrol diacetate was added to 10 cc. of 10% methanolic potassium hydroxide and to this mixture was added one drop of 6-ethoxy-2,2,4-trimethyl-1,2-dihydroquinoline as an antioxidant. The vessel containing the mixture was flushed out with nitrogen and the mixture was refluxed for a half hour. The refluxed solution was then cooled and enough hydrochloric acid added to make the solution strongly acid. An equal volume of water was then added to precipitate the coumestrol. The precipitate was filtered off and recrystallized from acetone to give a 90% yield of pure, crystalline coumestrol. Testing of the product by chromatographic methods and by ultra-violet spectroscopy indicated it was completely free from impurities.

Example III

Coumestrol diacetate (100 mg.) was refluxed 40 minutes with 10 ml. of 6% methanolic potassium hydroxide in an atmosphere of nitrogen. The mixture was then cooled, diluted with an equal volume of water, acidified with dilute hydrochloric acid, and concentrated in a stream of carbon dioxide to precipitate the coumestrol. The coumestrol was separated, dissolved in acetone-methanol and boiled a few minutes with about 20 mg. of charcoal. After removal of the charcoal, the solution was concentrated to about 3 ml. and allowed to stand for about an hour. The pure coumestrol which crystallized out of solution was then separated.

Having thus described the invention, what is claimed is:

1. The method of recovering pure 7',6-dihydroxycoumarino-(3',4'-3,2) coumarone from an impure mixture containing the same which comprises reacting the mixture with an acylating agent of the group consisting of the anhydride, the chloride, the bromide, and the iodide of a carboxylic acid selected from the group consisting of alkanoic acids, oleic acid, palmitoleic acid, benzoic acid, dinitrobenzoic acid, o-toluic acid, m-toluic acid, and p-toluic acid, to produce the corresponding ester of said 7',6-dihydroxycoumarino-(3',4'-3,2) coumarone, separating said ester from the esterification reaction mixture, subjecting it to alkaline hydrolysis to convert the ester groups to hydroxy groups, acidifying the alkaline reaction mixture to produce pure 7',6-dihydroxycoumarino-(3',4'-3,2) coumarone, and isolating the pure 7',6-dihydroxycoumarino-(3',4'-3,2) coumarone from the resulting acidified mixture.

2. The method of claim 1 wherein the acylating agent is acetic anhydride.

3. The method of claim 1 wherein potassium hydroxide is used as the alkaline agent for carrying out the alkaline hydrolysis.

4. The method of claim 1 wherein the alkaline hydrolysis is conducted in the presence of an antioxidant.

5. The method of claim 1 wherein the alkaline hydrolysis is conducted in the presence of a minor proportion of 6-ethoxy-2,2,4-trimethyl-1,2-dihydroquinoline as an antioxidant.

References Cited in the file of this patent

Karrer: Organic Chem., 4th English ed., p. 431, Elsevier Pub. Co., New York (1950).